Nov. 11, 1924.
W. DALLAS ET AL
1,515,461
SAFETY VALVE FOR LIQUID GAUGES
Filed Nov. 2, 1921
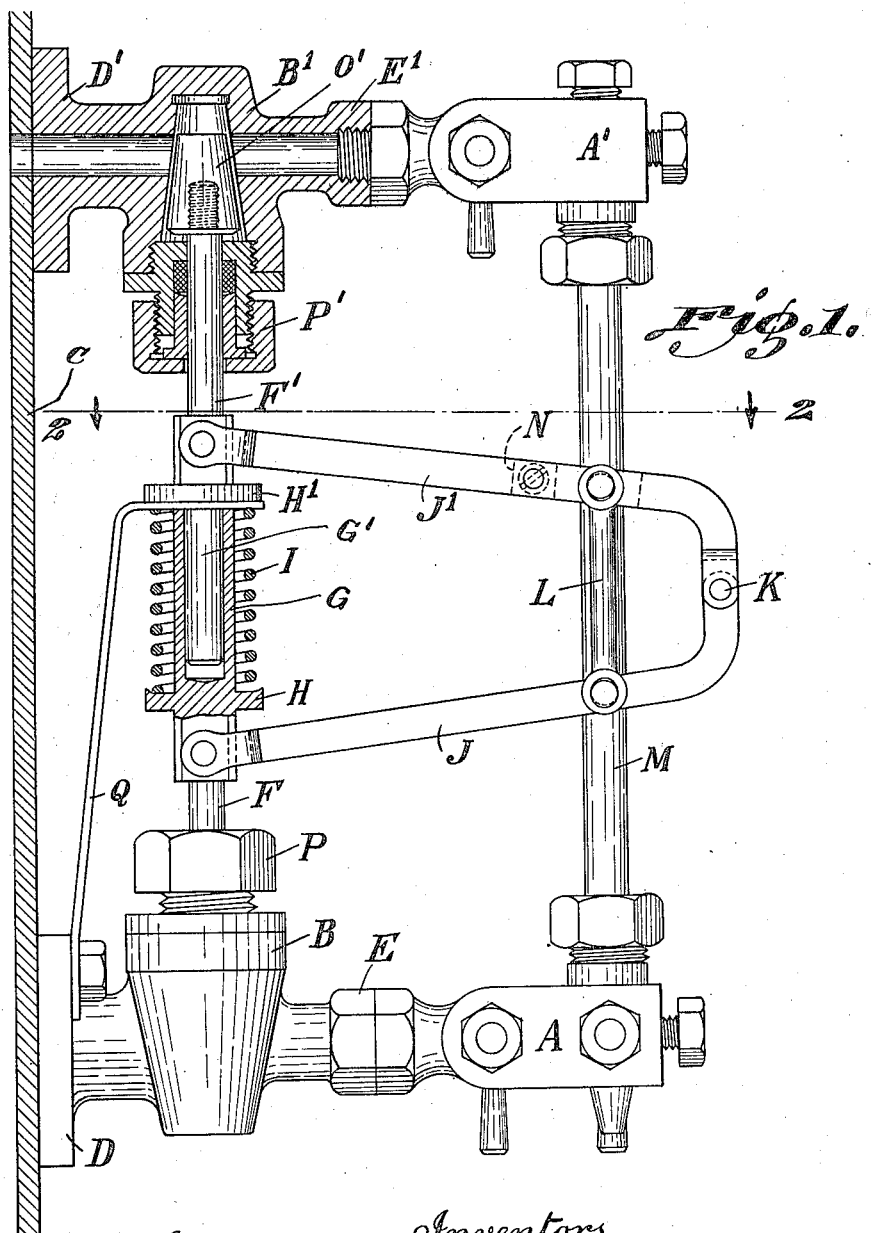
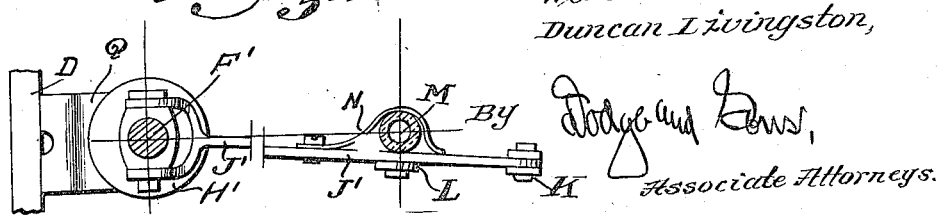
Inventors
William Dallas
Duncan Livingston,
By Dodge and Sons,
Associate Attorneys.

Patented Nov. 11, 1924.

1,515,461

UNITED STATES PATENT OFFICE.

WILLIAM DALLAS AND DUNCAN LIVINGSTON, OF RANGOON, BURMA, INDIA.

SAFETY VALVE FOR LIQUID GAUGES.

Application filed November 2, 1921. Serial No. 512,295.

*To all whom it may concern:*

Be it known that we, WILLIAM DALLAS and DUNCAN LIVINGSTON, subjects of the King of Great Britain, residing in Rangoon, Burma, India, have invented certain new and useful Improvements in or Relating to Safety Valves for Liquid Gauges, of which the following is a specification.

This invention relates to improvements in safety devices for liquid gauge glasses of the type in which, on the breakage of the gauge glass, valves are adapted to come automatically into action to shut off the flow of liquid to the glass. The invention has for its object an improved safety device of the kind which is intended to be fitted to stills or like apparatus containing hot liquids liable to spontaneous ignition if the gauge glass should break, and having for its purpose the automatic shutting off of the flow of liquid to the gauge glass in case of breakage of the latter, and ignition of the liquid.

According to this invention, a fusible strut or link in close proximity to the gauge glass, is adapted to hold together a pair of levers pivoted together and connected respectively to sliding spindles carrying plug-cocks that control communication between the still, or the like, and the gauge glass. The plug spindles have male and female members that form a sliding joint. The arrangement is such that the plug-cocks are normally held in open position by the levers against the pressure of a spring, but upon the breaking of the glass and the liquid catching fire, the fusing of the strut thus caused releases the levers, and the plug-cocks then automatically close under the action of the spring so as to cut off the flow of liquid to the region of the fire.

Fig. 1 is a side elevation of the device, certain parts being shown in section, and Fig. 2 is a section taken on line 2—2 of Fig. 1.

The invention will be understood from the following description reference being had to the accompanying drawing which shows the apparatus in side elevation, with parts in section.

In the drawing A A', represent ordinary gauge-glass fittings. B, B' are plug casings attached to a still or other vessel C by flanges D, D'. Both plug casings are identical. The upper one is shown in section in the drawing. The gauge-glass device fits into socket E, E' in the plug casings.

The plug spindles F, F' are extended to form female and male members G and G', respectively, to provide a sliding joint. Collars H, H' compress between them a spring I by means of levers J, J', pivoted together at one end at K and at the other end connected to the collars H, H', respectively. The levers are held together by a strut or link L of fusible metal.

This fusible metal strut L is held in close proximity to the gauge glass M by means of a clip N attached to the lever J'. This fusible metal strut is rigid and strong enough to hold the spring I under compression when subjected only to ordinary temperature.

O' is a plug attached to the plug spindle F' for controlling the passages in the plug casing B'. There is a similar plug O (not shown) attached to the spindle F in the casing B. P and P' are ordinary stuffing boxes and glands through which spindles F, F' pass. The arm Q at its upper end engages with the under side of collar H' and serves to support the parts so as to insure that plugs O, O' are normally in their open position.

The mode of action of the device is as follows:—

In the position illustrated in the drawing the fusible strut L holds the levers J, J' together, the spring I is under compression, and the plugs O—O' are in the open position. In the event of the gauge-glass breaking, and the liquid catching fire, the fusible strut L melts. This releases the levers J, J' and the spring I, lever arms J, J', connected to the members G, G' of the sliding joint being then forcibly moved in opposite directions by the pressure of the expanding spring I acting on the sliding joint members. At the same time the spindles F, F', carrying the plugs O, O', are also moved in opposite directions to force the plugs on to their seats in the plug casings B, B' and so shut off the flow of liquid to the region of the fire.

We declare that what we claim is:—

1. The combination of a gauge glass; a pair of tubular fittings adapted to be connected at their inner ends to a still, or the like, and connected at their outer ends to and supporting said gauge glass, each of said fittings having a plug cock casing formed therein; a plug, in each of said casings, adapted for movement to open or close the passageway through the fittings; a spindle connected to each of said plugs and projecting outwardly through an opening in its casing, the outer ends of said spindles being slidably connected together; a pair of spaced levers pivotally connected together at one end and having their opposite ends connected, one to one of said spindles and the other to the other of said spindles; a fusible strut arranged in close proximity to said gauge glass and connecting said levers together intermediate their ends to normally maintain said plugs in open position; and spring means tending to move said plugs to closed position.

2. The combination of a gauge glass; a pair of tubular fittings adapted to be connected to their inner ends to a still, or the like, and connected at their outer ends to and supporting said gauge glass, each of said fittings having a plug cock casing formed therein; a plug, in each of said casings, adapted for longitudinal reciprocatory movement to open or close the passageway through the fitting; a spindle connected to one of said plugs and projecting outwardly through an opening in its casing, the outer end of said spindle being provided with a male extension; a spindle connected to the other of said plugs and projecting outwardly through an opening in its casing, the outer end of said spindle being provided with a female extension adapted to telescope with said male extension, to form a sliding joint; a pair of spaced levers pivotally connected together at one end and having their opposite ends pivotally connected, one to said male extension and the other to said female extension; a fusible metal strut arranged in close proximity to said gauge glass and connecting said levers together intermediate their ends to normally maintain said plugs in open position; means for normally supporting said plug cocks in open relation; and spring means located on said male and female extensions, said means engaging with the spindles and normally held under compression thereby for urging said plugs towards closed position.

In witness whereof, I have hereunto signed my name this 5th day of July 1921, in the presence of two subscribing witnesses.

WILLIAM DALLAS.

Witnesses:
B. GOMES,
C. DANACOBY.

In witness whereof, I have hereunto signed my name this 16th day of August 1921, in the presence of two subscribing witnesses.

DUNCAN LIVINGSTON.

Witnesses:
MARGARET THOMLINSON,
LAURA J. WYLIE.